United States Patent [19]

Weppner

[11] Patent Number: 5,023,153
[45] Date of Patent: Jun. 11, 1991

[54] SOLID ELECTRODE IN AN ELECTROLYTIC CELL

[75] Inventor: Werner Weppner, Stuttgart, Fed. Rep. of Germany

[73] Assignee: Max-Planck-Gesellschaft zur Forderung der Wissenschafter e.V., Gottingen, Fed. Rep. of Germany

[21] Appl. No.: 333,777

[22] Filed: Apr. 5, 1989

Related U.S. Application Data

[63] Continuation of Ser. No. 250,968, Sep. 23, 1988, abandoned, which is a continuation of Ser. No. 38,472, Apr. 13, 1987, abandoned, which is a continuation of Ser. No. 906,153, Sep. 8, 1986, abandoned, which is a continuation of Ser. No. 810,643, Dec. 18, 1985, abandoned, which is a continuation of Ser. No. 726,176, Apr. 23, 1985, abandoned, which is a continuation-in-part of Ser. No. 230,601, Jan. 28, 1981, abandoned.

[30] Foreign Application Priority Data

Feb. 7, 1980 [DE] Fed. Rep. of Germany ....... 3004571

[51] Int. Cl.$^5$ ........................ H01M 4/86; H01M 4/48; H01M 4/58; G02F 1/17
[52] U.S. Cl. ...................................... 429/40; 429/218; 340/785; 350/357
[58] Field of Search ............... 429/191, 193, 194, 218, 429/219, 222, 229, 40; 340/785

[56] References Cited

U.S. PATENT DOCUMENTS

| | | | |
|---|---|---|---|
| 4,085,259 | 4/1978 | Lauck | 429/194 |
| 4,362,793 | 12/1982 | Bittihn et al. | 429/218 |

OTHER PUBLICATIONS

Gordon et al., Material Science Monographs, vol. 6, pp. 925-926 (1980).
J. O. Besenhard and H. P. Fritz, Electrochim, Acta 20. 513 (1975).
Shukla, et al., Zeitschrift fur Physikalische Chemi Neue Folge, Bd. 118, S. 59-67 (1979).
W. Weppner and R. A. Huggins (I), Journal of Solid State Chemistry 22, 297-308 (1977), "Electrochemical Investigation of the Chemical Diffusion, Partial Ionic Conductivities, & Other Kinetic Parameters in Li$_3$Sb and Li$_3$Bi".
W. Weppner and R. A. Huggins (II), J. Electrochem. Soc., Oct. 1977, vol. 124, No. 10, pp. 1569-1578, "Determination of the Kinetic Parameters of Mixed-Conducting Electrodes and Application to the System Li$_3$Sb".
W. Weppner and R. A. Huggins (III), J. Electrochem. Soc., vol. 125, No. 1, Jan. 1978, pp. 7-14, "Thermodynamic Properties of the Intermetallic Systems Lithium-Antimony and Lithium-Bismuth".
W. Weppner and R. A. Huggins (IV), Proc. Sympos. Electrode Materials and Processes for Energy Conversion and Storage (J. D. E. McIntyre, S. Srinivasan, and F. G. Will, Eds.), The Electrochemical Society, Princeton, N.J., 1977, 833-45, "Determination of the Kinetic and Thermodynamic Parameters of Mixed Conducting Electrodes and Application to the Systems Li-Sb and Li-Bi".
Weppner et al, Electrochemical Investigation of the Chemical Diffusion, Partial Ionic Conductivities, and Other Kinetic Parameters in Lithium Antimonide (Li$_3$Sb) and Lithium Bismuthide (Li$_3$Bi). Chemical Abstracts, vol. 88:29460c, 1978.
Shukla et al, Electron Transport Studies of α-Silver Sulfide, Chemical Abstracts, vol. 92:189746m, 1979.
Fiordiponti et al, Nonaqueous Batteries with BiF$_3$ Cathodes, J. Electrochem. Soc., Apr. 1978, pp. 511-515.
Jasinski, High Energy Batteries, Jul. 1967, pp. 83-84.

*Primary Examiner*—Donald L. Walton
*Attorney, Agent, or Firm*—Foley & Lardner

[57] ABSTRACT

A solid electrode in an electrolytic cell for rapid incorporation and exclusion of ions wandering to and from the electrode by way of an electrolyte with a minimum of voltage loss, in particular for a fuel cell, a high-performance battery, an electrochrome sign display unit or an electro-chemical storage element. The electrode comprises a structure having a higher electrical conductivity for electrons or holes than for the ions, and wherein the concentration of the electrons or holes movable within said electrode is lower than the concentration of the ions movable within the electrode.

20 Claims, 5 Drawing Sheets

SOLID ELECTRODE IN AN ELECTROLYTIC CELL

CROSS-REFERENCE TO RELATED APPLICATIONS

This is a continuation of application Ser. No. 07/250,968, filed Sept. 23, 1988, which was a continuation of application Ser. No. 07/038,472 * filed Apr. 13, 1987 which, in turn was a continuation of application Ser. No. 06/906,153 * filed Sept. 8, 1985 which was a continuation of Ser. No. 06/810,643 * filed Dec. 18, 1985, was was a continuation of application Ser. No. 06/726,176 * filed Apr. 23, 1985 which, in turn, was a continuation-in-part of application Ser. No. 06/230,601 * filed Jan. 28, 1981.

(* was abandoned)

BACKGROUND OF THE INVENTION

1. Field of the Invention

The invention concerns a solid electrode in an electrolytic cell for rapid inclusion and exclusion of ions wandering to and from said electrode by way of an electrolyte with a minimum of voltage loss, which is particularly suited for a fuel cell, a high-performance battery, an electrochrome sign display unit or an electro-chemical storage element.

2. Description of the Prior Art

It is known to use solid electrodes with maximum electronic, generally metallic, conductivity. However, these electrodes permit only a low current density during charging and discharging. Voltage losses (polarization) occur during discharging and voltage excesses during charging, resulting in reduction of usable energy. In order to achieve high currents, the electrode materials, when liquid electrolytes could be used, had to be made porous in order to achieve a large surface (contact surface between electrode and electrolyte).

Accordingly, the task of the present invention is directed toward increasing the current density (current-/electrode surface) during charging and discharging, reducing voltage losses during discharging, and reducing voltage excesses during the charging.

SUMMARY OF THE INVENTION

The present invention is directed to an electrode which has a higher electrical conductivity for electrons or holes than for the ions and the concentration of the electrons or holes movable within said electrode is lower than that of the ions movable within said electrode and contained therein.

Figure 1:
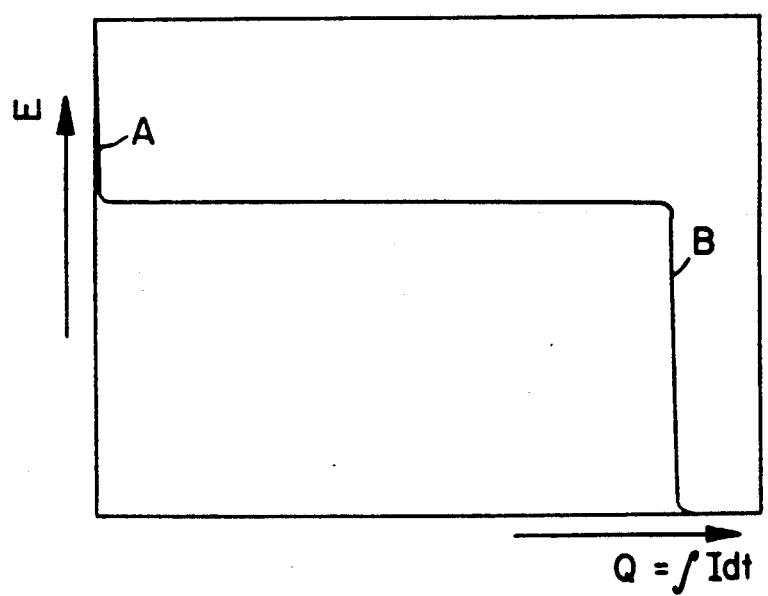
FIG. 1 represents an example of a stationary discharge curve. The equilibrium-cell voltage E in relation to the amount of flowed charge $Q = \int I dt$ (time integral over the flowed current) is represented.

The curve of FIG. 1 is also called a CT-curve (coulometric titration curve). During discharge (to the right in FIG. 1), the curve descends sharply to point A corresponding to the charge amount $Q_A$. During discharge beyond point B, which corresponds to the charge $Q_B$, the curve sharply descends again.

Figure 2:
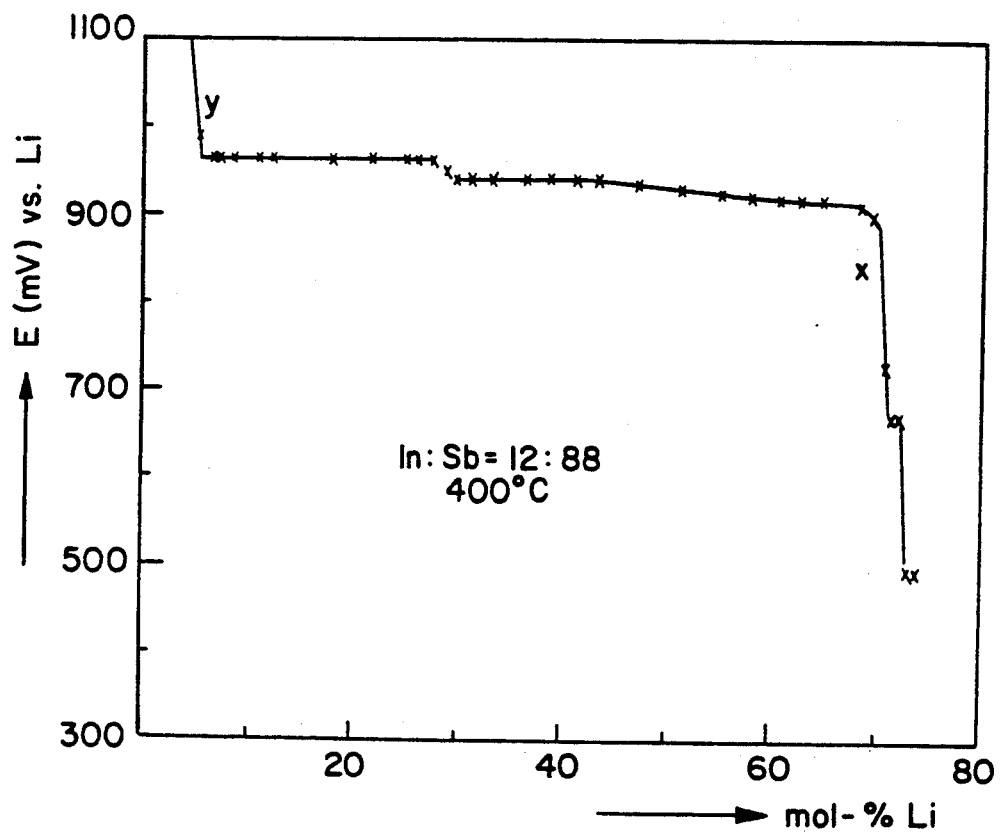

FIG. 2 is a coulometric titration curve of a galvanic lithium cell utilizing InSb as the cathode.

Figure 3:
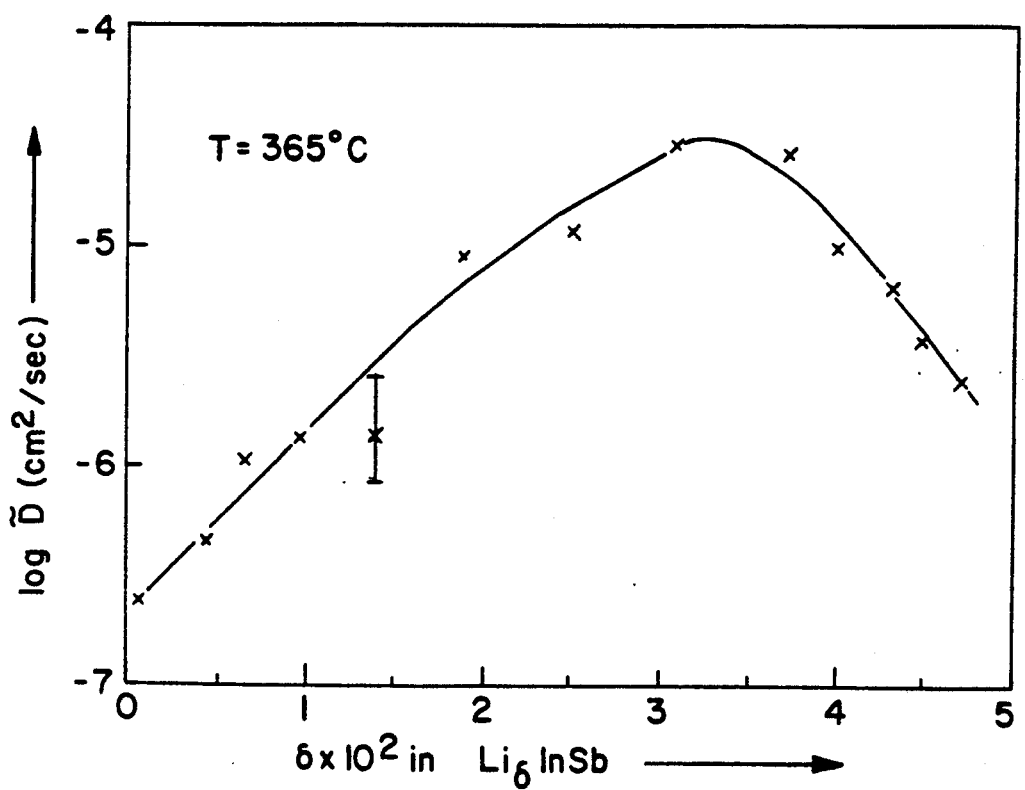

FIG. 3 plots the chemical diffusion coefficient as a function of lithium content in InSb.

Figure 4:
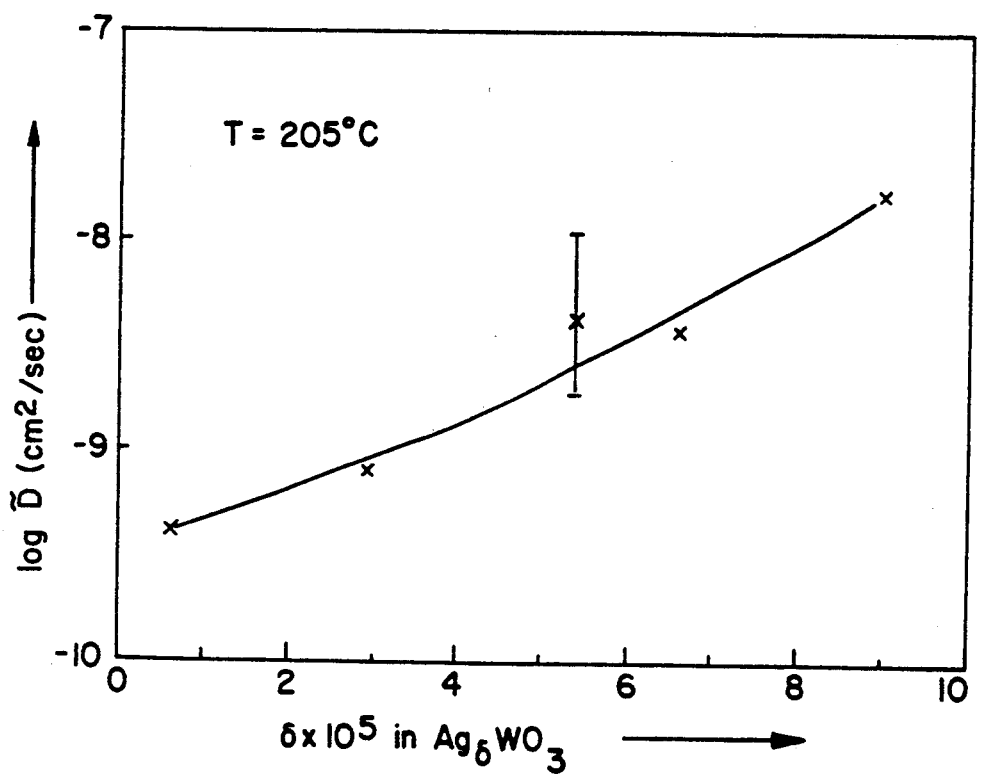

FIG. 4 plots the chemical diffusion coefficient as a function of silver content in $Ag_\delta WO_3$.

Figure 5:
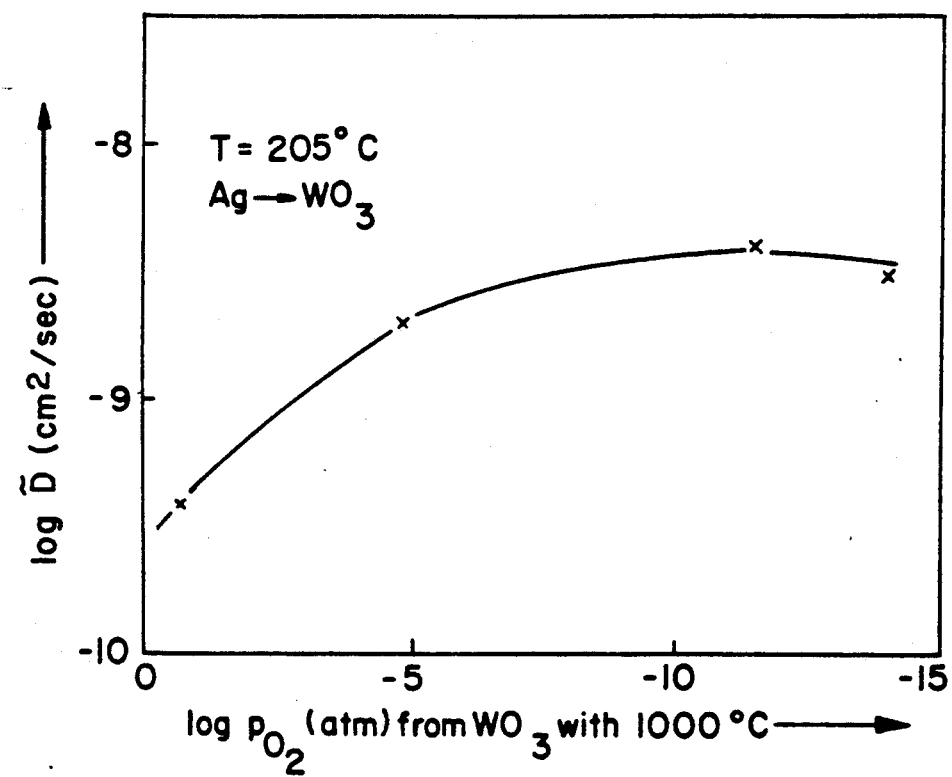

FIG. 5 plots the chemical diffusion coefficient as a function of partial pressure of oxygen.

DESCRIPTION OF THE PREFERRED EMBODIMENTS

Preferably, the electrode of the present invention is a semiconducting material. Surprisingly, an electrode according to the invention affords a better solution of the task than does an electrode having a high (metallic) electron conductivity or hole conductivity. In an electrode according to the present invention, the chemical balance with the ions is achieved very quickly during the charging and discharging, which also results in a slight polarization and consequently, slight losses (for example through heat).

In order to make the ion mobility as high as possible, the coulometric titration curve of the electrode (stationary discharge curve : equilibrium - cell voltage E as a function of the charge Q which has flowed) in the nearly discharged condition B and, preferably, also in the nearly completely charged condition A, falls off abruptly. The coulometric titration curve needs to have the abruptness in the nearly completely charged condition A only with a secondary cell (a rechargeable galvanic cell). With a primary element, which is intended only for a one-time discharge, only the abruptness in condition B is necessary. The requirement of abruptness in the condition A as well as in the condition B is advantageous not only with rechargeable batteries, but also with electrochrome sign display units and electrochemical storage elements, since in these cases the ions are to be transported quickly back and forth in both directions of the current. For the same reason it is preferred that the concentration of the defect spots receiving the movable ions is a substantial fraction, preferably more than 1 or 10%, of the maximum concentration of its content of movable ions.

It is difficult to indicate generally the conditions for the requirement of sufficient imperfection, for a fast ion transport. It is, however, sufficient that preferably 1 to 10% of the regular lattice positions be occupied "falsely".

In a preferred embodiment, the minimum slope $$\frac{dE}{dQ}$$

in the nearly fully discharged condition B and, preferably, also in the nearly charged condition A, is given by $$\frac{dE}{dQ} \geq 10^2 \frac{M k T}{m z^2 q^2 c V_M} \text{ preferably}$$

$$\frac{dE}{dQ} \geq 10^3 \frac{M k T}{m z^2 q^2 c V_M}$$

wherein $M$ = molecular weight ⎫
$m$ = mass              ⎬ of the stoichiometrically varying phase in the electrode in B or A
$V_M$ = mole volume     ⎭

$c$ = concentration of the movable ions
$z$ = elementary charge
$k$ = Boltzmann's constant -continued $T$ = absolute temperature.

The factor $10^2$ or $10^3$ contained in the indicated formula is substantially the thermodynamic enhancement factor W.

In a preferred embodiment, the electrode is characterized in that its thermodynamic enhancement factor W, determined through $$W = -\frac{t_e z\, q}{kT} \frac{dE}{d\delta}$$

wherein $$t_e = \frac{\sigma_e}{\sigma_e + \sigma_z}$$

and $\sigma_e$ = conductivity of the electrons or holes $\sigma_t$ = conductivity of movable ions $\delta$ = the stoichiometric number of the movable ions, is greater than $10^2$, preferably, greater than $10^3$.

For the electrode, the material found to be particularly suitable, is one which experiences a transformation at the nearly discharged condition B and the nearly completely charged condition A. In a successfully tested case, the material in the nearly charged condition A had at least approximately the composition Li dissolved in Sb or Bi and, in the nearly completely discharged condition B, at least approximately the composition $Li_3Sb$ or $Li_3Bi$. The enhancement factors of $Li_3Sb$ and $Li_3Bi$ are 70,000 and 370, respectively. Such enhancement factors cannot be achieved with known electrode materials, in particular, not with intercalation compounds like, for example, $Li_xTiS_2$. As a further suitable material, a material of the composition $\alpha$-$Ag_2S$ performed excellently. The enhancement factor of this material is around 10,000 which corresponds to a diffusion coefficient much higher than in most liquids.

The compound InSb is a known semiconductor which satisfies the requirement for high electronic mobility and for a small concentration of the electronic charge carriers. When utilizing this material as a cathode in galvanic lithium cells, applicant has discovered that the formation of novel ternary Li-In-Sb compounds results. In case of an excess of antimony, with an overall ratio of In:Sb of 12:88, the formation of the compound $Li_6InSb_3$ results, which along the quasi-binary section $InSb$-$Li_3Sb$ has a large stoichiometric extension towards the antimony rich side. The formation of $Li_2Sb$ or $Li_3Sb$ does not occur because of the presence of indium.

The coulometric titration curve presented in FIG. 2 exhibits the shape required according to the present invention. At the beginning as well as at the conclusion of the discharge, a steep drop is shown (as required). During the current flow of 5-10 mA/cm$^2$ only a very minor concentration polarization excess voltage of less than 50 mV appears. The product of the reaction with the nominal formula $Li_6InSb_3$ is semiconductive, and an extremely high chemical diffusion coefficient of $2 \times 10^{-4}$ cm$^2$/sec was measured according to an electrochemical process. Accordingly, the diffusion of the lithium ions in this solid body is faster than typically in the melted state. The formation of the new ternary, semiconductive lithium compounds occurs at the point designated by "x" in FIG. 2. It is formed at an early stage of the discharge at the boundary surface between electrode and electrolyte and permits a rapid transport of the reactants in the further process of the discharge.

Such an electrode is particularly suitable for application in batteries with high discharge current densities. Equally, the cell can rapidly be charged again, since by means of reduction, InSb with the concentration of lithium indicated by "y" in the coulometric titration curve (FIG. 2), is formed. This phase $Li_8InSb$ containing lithium to a small extent is also semiconductive, exhibits a rapid drop in the titration curve (FIG. 2) and permits a rapid transport of lithium with a chemical diffusion coefficient of $1 \times 10^{-8}$ cm$^2$/sec. at 365° C.

Still further, with a mixture of In:Sb of 1:2 present at the cathode side, there still is no formation of $Li_2Sb$ or $Li_3Sb$ or any other hitherto known phase. In a cell with a lithium electrolyte and an anode containing lithium, applicant has found that there occurs the formation of the new ternary compound $Li_3InSb_2$. A coulometric titration curve (not shown) determined by voltage measurement under thermodynamic equilibrium conditions shows a steep drop at the beginning and at complete conversion into $Li_3InSb_2$. From the inclines or slopes of the titration curve, it is possible to calculate the thermodynamic magnification factors of 245 or 650 for both areas. Electrical conductivity measurements of specimens with different lithium content show semiconductive properties of the material. Based on this material property, the selection of this material as a solid fast electrode in an electrolytic cell is particularly suitable. Such tests were performed through a utilization of melted salt-electrolytes from eutectic mixtures of LiCl and KCl as well as solid electrolytes of solid solutions of and $Li_4SiO_4$ and $Li_3PO_4$. This resulted in small voltage losses of less than 100 mV at currents of 10 mA/cm$^2$ at 350° C. The chemical diffusion coefficient describing the velocity of the concentration-equalization has values of between $10^{-4}$ and $10^{-5}$ cm$^2$/sec. The utilization of InSb with formation of $Li_3InSb_2$ is therefore especially suitable for a lithium heavy duty cell with rapid discharge and rechargeability.

In yet another embodiment of the present invention, InP can be utilized still further. Particularly, good results are obtained when utilizing a mixture of InP and red phosphorous in a molar proportion of 1 : 1 in a lithium cell. Specimens with different lithium compositions are produced metric titration with lithium and the lithium activity is determined by measurements of electromotive force. Apart from a steep drop of the coulometric titration curve at the beginning of the assimilation of lithium, a high steepness results during the formation of the compound $Li_3InP_2$. The thermodynamic enhancement factors assume values of 1240 and 620 respectively. The specimens semiconductive independent of their composition. Their suitability as an electrode material on the basis of these material properties is confirmed through their use in a galvanic cell with a lithium solid electrolyte of $Li_4SiO_4$ and $Li_3PO_4$. A discharge with current densities of 15 mA/cm$^2$ is possible with a concentration polarization of only 70 mV. The chemical diffusion coefficients measured in the compound $Li_3InP_2$ assumes values of $1-5 \times 10^{-6}$ cm$^2$/sec.

at 200° C. At the start of the discharge even higher diffusion coefficients can be achieved with a small phosphorous content. Apart from the fast kinetics, the described electrodes exhibit the advantage of a high absorption of 3 lithium atoms per InSb molecule and P-atom.

In still another embodiment of the present invention, the electrode system Li - CdS was found to be a fast electrode in a galvanic lithium cell. In addition to the start of absorption of lithium, a very rapid drop in the titration curve resulted with the compound $Li_2CdS_2$, corresponding to thermodynamic enhancement factors of about 1000 to 1400. Each compound remains semiconductive just as the pure CdS. During a discharge in a galvanic cell, $Li_2CdS_2$ is formed at an early stage at the boundary surface with the electrolyte. This material is kinetically fast and during the period of the discharge, no further polarization and no essential voltage loss occur. The transport of lithium by the reaction layer being formed to the unconsumed active raw material is only slightly impeded and permits the solid body-electrode reaction to proceed in a very speedy manner.

Other suitable electrode materials include oxidic semiconductors, e.g., ZnO, which are fast electrodes in galvanic lithium cells. Up to a composition of $Li_2ZnO$, it is possible to achieve high current values of over 5 mA/cm$^2$ with small voltage losses of 100 to 150 mV. The thermodynamic enhancement factors are at about 850 and 750 for the charged or discharged state.

Apart from the aforementioned ternary systems, the rapid insertion of lithium into the ternary semiconductive compound CdSnAs with the formation of new quaternary compounds was particularly effective. This was suggested by the high electronic mobility of 10,000 cm$^2$/Vsec in CdSnAs at room temperature together with the steepness of the coulometric titration curve at the start of the insertion of lithium as well as at the formation of $Li_3CdSnAs_3$. The confirmation occurred through presupply of CdSnAs and elementary As in molar proportion of 1 : 2.

As a further semiconductive compounds, ZnS as an electrode in galvanic lithium cells is also found to be a suitable rapid solid body electrode. As a raw material, a mixture consisting of ZnS and sulfur in the proportion of 1 : 1 is used. A coulometric titration curve (not shown) shows a steep drop according to the required criteria at the approximate composition $Li_2ZnS_2$. The property of semiconductivity is maintained for the entire composition range. The current density amounted to 1 mA/cm$^2$ at a voltage polarization of 150 mV at 320° C.

Semiconducting properties can also be produced in TiO$_2$ by doping with Ta. TiO$_2$ is (at higher oxygen partial pressures) a bad conductor or insulator. During reaction with lithium, ion-conducting compounds are formed which, because of the missing electronic charge carriers for charge equalization, do not allow a fast equalization of stoichiometries. This situation can be changed by making TiO$_2$ semiconductive through doping with tantalum oxide. Through insertion of Ta into the crystal lattice of the rutile (TiO$_2$), a conductivity independent of oxygen partial pressure is achieved. In a galvanic lithium cell with TiO$_2$, which is doped with 2 mol % Ta, no blocking of the reaction with lithium occurs. It is possible to achieve current densities of 2 mA/cm$^2$ at a concentration polarization in the electrode of 200 mV at 300° C. up to the binary section $Li_2O$ - TiO$_2$.

PbS electrodes in lithium cells may also be suitable in the present invention. PbS is a known semiconductor with a mobility of the electronic charge carriers of 600 cm$^2$/Vsec. Analogously to the above-described electrode, a rapid insertion of lithium proves to be possible.

In another embodiment of the present invention, the kinetics of InSb is varied by insertion of lithium. Thus, in a special application of the ion or atom transport in solid body, there is created a local change of composition by application of electric voltage in contrast the up to now described equalization of local concentration homogeneities in an equilibrium setting.

For utilization of this process in certain elements, a high chemical diffusion in a solid body is required. InSb can, in this manner, be on the one side made electronically n-conducting and, on the other side, p-conducting. In order to accelerate the setup of the process, the electronic conductivity of the compound is increased by insertion of lithium (Li$^+$ and e$^-$). A higher thermodynamic enhancement factor is thereby achieved. FIG. 3 shows the dependence of the equilibrium setting depending on the lithium content in the InSb.

In accordance with the present invention, an increase in response speed in an electrochromatic sign display can be obtained. Thus, WO$_3$ is a known material for generating a color change by means of an (electrochemical) insertion of hydrogen, lithium or other elements. In the most favorable case when utilizing a very thin specimen, the speed is approximately one second and thus too slow for many potential applications, such as, for example, the presentation of moving pictures (in flat television screens). Through the insertion of silver, WO$_3$ is brought to the semiconducting state required for the rapid diffusion in the solid body, which thereby causes insertion speeds greater by an order of magnitude for the ions effecting the color changes. The chemical diffusion coefficient is shown in FIG. 4 as a function of the silver content. At 205° C. with an insertion of $9 \times 10^{-5}$ Ag per WO$_3$ an increase by 1.5 decimal potentials is seen. Through this, the WO$_3$, which is electronically changed in this way, could also be utilized for moving pictures. The coulometric titration curve exhibits a thermodynamic enhancement factor of 18,000.

Yet another embodiment for the production of a higher electrical conductivity in WO$_3$ consists in tempering of the material under reducing conditions, whereby the oxygen partial pressure lies within the existence range of the compound. The partial removal of O$^-$ ions is compensated by the insertion of two electrons. Through these electrons, the chemical diffusion is increased by up to 1.5 decimal potentials as is shown in FIG. 5. FIG. 5 shows the change of the chemical diffusion coefficient with the oxygen partial pressure, at which the specimen is first annealed at 100° C. and then quenched. The thermodynamic factor for the diffusion of silver lies at 9000 at an oxygen partial pressure of $10^{-5}$ atm at 1000° C.

Corresponding to these embodiments, it is possible to find further systems of solid rapid electrodes which can be varied by suitable doping in order to arrive at a rapid concentration equalization in the solid state.

While the foregoing description and drawings represent the preferred embodiments of the present invention, it will be obvious to those skilled in the art that various changes and modifications may be made therein without departing from the true spirit and scope of the present invention.

I claim:

1. An electrochemical device comprising at least a first electrode, a second electrode, and an electrolyte separating said first and second electrodes, wherein
   (A) at least one electrode of said first and second electrodes is comprised of a solid semiconductive material that (i) is characterized by a coulometric titration curve that decreases sharply at a portion of said curve corresponding to a discharged condition B of said electrode and (ii) has a higher conductivity for electrons or holes than for movable ions; and
   (B) said device is an electrochrome sign display or a fuel cell, wherein said electrode is characterized by a thermodynamic enhancement factor W which conforms to the relationship $$W = -\frac{t_e z\, q}{kT}\, \frac{dE}{d\delta}$$

wherein $t_e = \dfrac{\sigma_e}{\sigma_e + \sigma_i}$ and $\sigma_e$ = conductivity of the electrons or holes $\sigma_i$ = conductivity of movable ions $\delta$ = the stoichiometric number of the movable ions, is greater than $10^2$.

2. An electrochemical device according to claim 1, wherein said device is an electrochrome sign display.

3. An electrochemical device according to claim 2, wherein said semiconductive material has a regular lattice structure with a concentration of imperfections in positions occupied falsely and available for receiving movable ions, said concentration ranging between about 1% and about 10% of a maximum concentration of movable ions contained in said electrode.

4. The electrochemical device according to claim 2, wherein said thermodynamic enhancement factor W has a value that is larger than $10^3$.

5. An electrochemical device according to claim 2, wherein said semiconductive material has a concentration of electrons or holes movable therein that is smaller than the concentration of movable ions therein.

6. An electrochemical device according to claim 2, wherein said coulometric titration curve has a minimum slope $dE/dQ$, in said portion of said curve corresponding to said discharged condition B, which is defined by the relationship $$\frac{dE}{dQ} \geq 10^2 \frac{M\, k\, T}{m\, z^2\, q^2\, c\, V_M} \quad (I)$$

wherein M is denotes molecular weight, m denotes mass and $V_M$ denotes mole volume of a stoichiometrically varying phase of said electrode; c denotes concentration of movable ions; z denotes the charge number of said ions; k denotes Boltzmann's constant and T denotes absolute temperature.

7. An electrochemical device according to claim 6, wherein said minimum slope conforms to the relationship $$\frac{dE}{dQ} \geq 10^3 \frac{M\, k\, T}{m\, z^2\, q^2\, c\, V_M}. \quad (II)$$

8. An electrochemical device according to claim 2, wherein said coulometric titration curve also decreases sharply at a portion of said curve corresponding to a charged condition A of said electrode.

9. An electrochemical device according to claim 8, wherein said coulometric titration curve has a minimum slope $dE/dQ$, in said portion of said curve corresponding to said discharged condition A, which is defined by the relationship $$\frac{dE}{dQ} \geq 10^2 \frac{M\, k\, T}{m\, z^2\, q^2\, c\, V_M} \quad (I)$$

wherein M is denotes molecular weight, m denotes mass and $V_M$ denotes mole volume of a stoichiometrically varying phase of said electrode; c denotes concentration of movable ions; z denotes the charge number of said ions; k denotes Boltzmann's constant and T denotes absolute temperature.

10. An electrochemical device according to claim 9, wherein said minimum slope conforms to the relationship $$\frac{dE}{dQ} \geq 10^3 \frac{M\, k\, T}{m\, z^2\, q^2\, c\, V_M}. \quad (II)$$

11. The electrochemical device according to claim 8, wherein said thermodynamic enhancement factor W has a value that is larger than $10^3$.

12. An electrochemical device according to claim 1, wherein said device is a fuel cell.

13. An electrochemical device according to claim 12, wherein said semiconductive material has a concentration of electrons or holes movable therein that is smaller than the concentration of movable ions therein.

14. An electrochemical device according to claim 12, wherein said coulometric titration curve has a minimum slope $dE/dQ$, in said portion of said curve corresponding to said discharge condition B, which is defined by the relationship $$\frac{dE}{dQ} \geq 10^2 \frac{M\, k\, T}{m\, z^2\, q^2\, c\, V_M} \quad (I)$$

wherein M is denotes molecular weight, m denote mass and $V_M$ denotes mole volume of a stoichiometrically varying phase of said electrode; c denotes concentration of movable ions; z denotes the charge number of said ions; k denotes Boltzmann's constant and T denotes absolute temperature.

15. An electrochemical device according to claim 14, wherein said minimum slope conforms to the relationship $$\frac{dE}{dQ} \geq 10^3 \frac{M\, k\, T}{m\, z^2\, q^2\, c\, V_M}. \quad (II)$$

16. An electrochemical device according to claim 12, wherein said coulometric titration curve also decreases sharply at a portion of said curve corresponding to a charge condition A of said electrode.

17. An electrochemical device according to claim 16, wherein said coulometric titration curve has a minimum slope $dE/dQ$, in said portion of said curve corresponding to said discharge condition A, which is defined by the relationship $$\frac{dE}{dQ} \geq 10^2 \frac{M k T}{m z^2 q^2 c V_M} \qquad (I)$$

wherein M is denotes molecular weight, m denotes mass and $V_M$ denotes mole volume of a stoichiometrically varying phase of said electrode; c denotes concentration of movable ions; a denotes the charge number of said ions; k denotes Boltzmann's constant and T denotes absolute temperature.

18. An electrochemical device according to claim 17, wherein said minimum slope conforms to the relationship $$\frac{dE}{dQ} \geq 10^3 \frac{M k T}{m z^2 q^2 c V_M}. \qquad (II)$$

19. The electrochemical device according to claim 16, wherein said thermodynamic enhancement factor W has a value that is larger than $10^3$.

20. An electrochemical device according to claim 12, wherein said thermodynamic enhancement factor W has a value that is larger than $10^3$.

* * * * *